Figure 1:
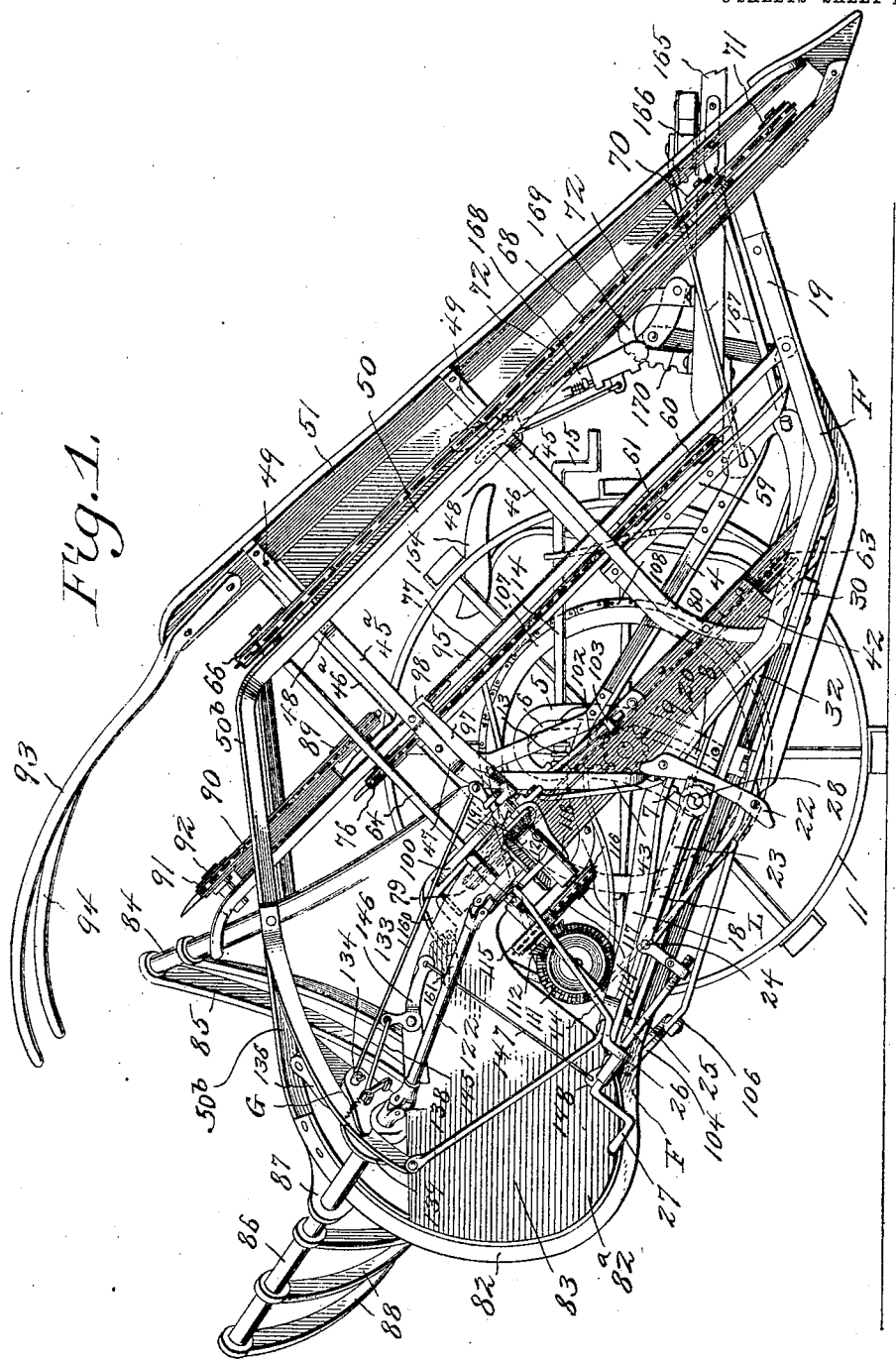

No. 797,075. PATENTED AUG. 15, 1905.
W. H. ROE.
CORN HARVESTER.
APPLICATION FILED JUNE 28, 1904.

5 SHEETS—SHEET 1.

Witnesses
E. F. Stewart
Wm. Bagger

William H. Roe, Inventor.
by C. A. Snow & Co
Attorneys

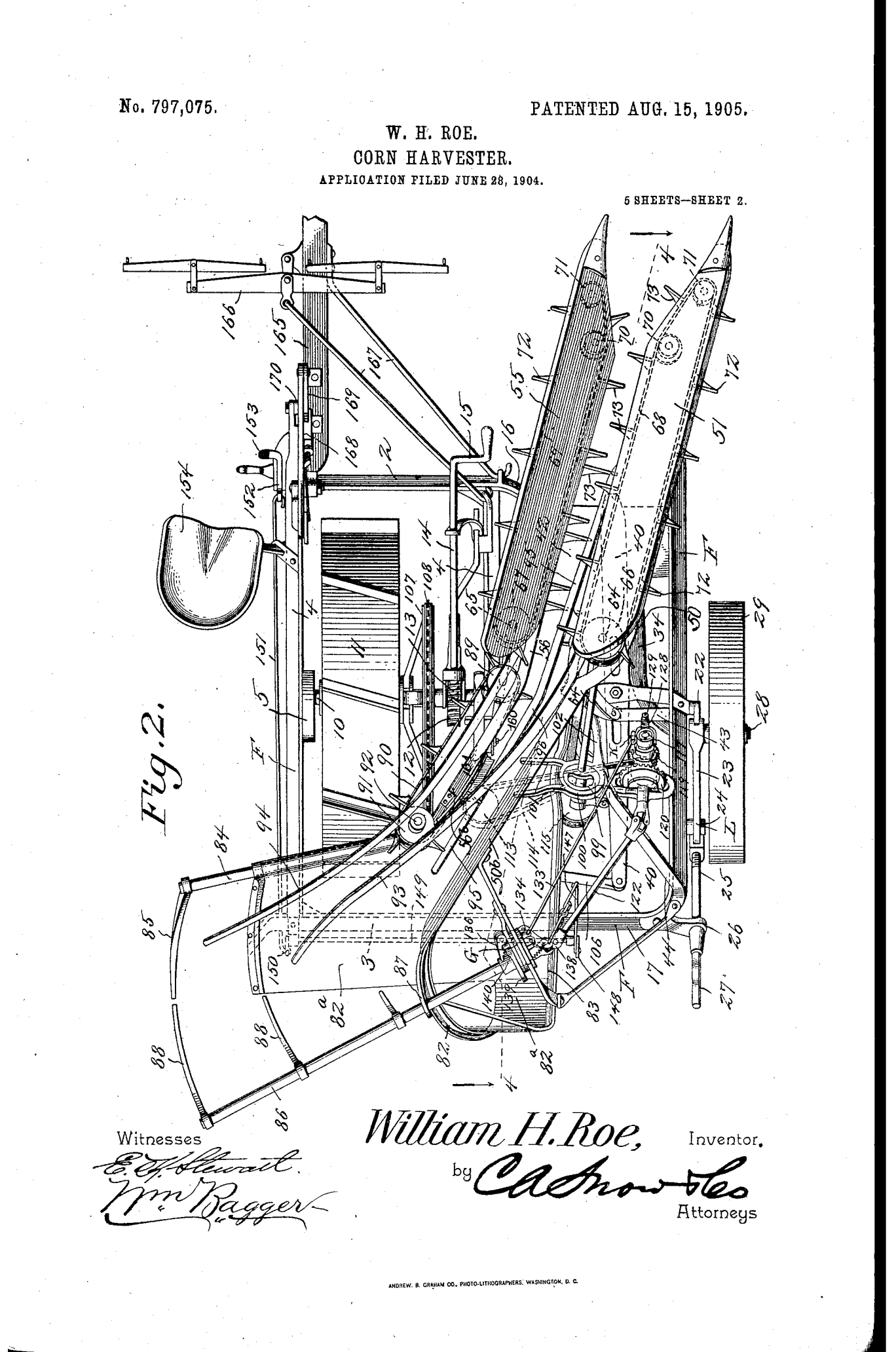

No. 797,075. PATENTED AUG. 15, 1905.
W. H. ROE.
CORN HARVESTER.
APPLICATION FILED JUNE 28, 1904.

5 SHEETS—SHEET 2.

Fig. 2.

Witnesses

William H. Roe, Inventor.
by C. A. Snow & Co.
Attorneys

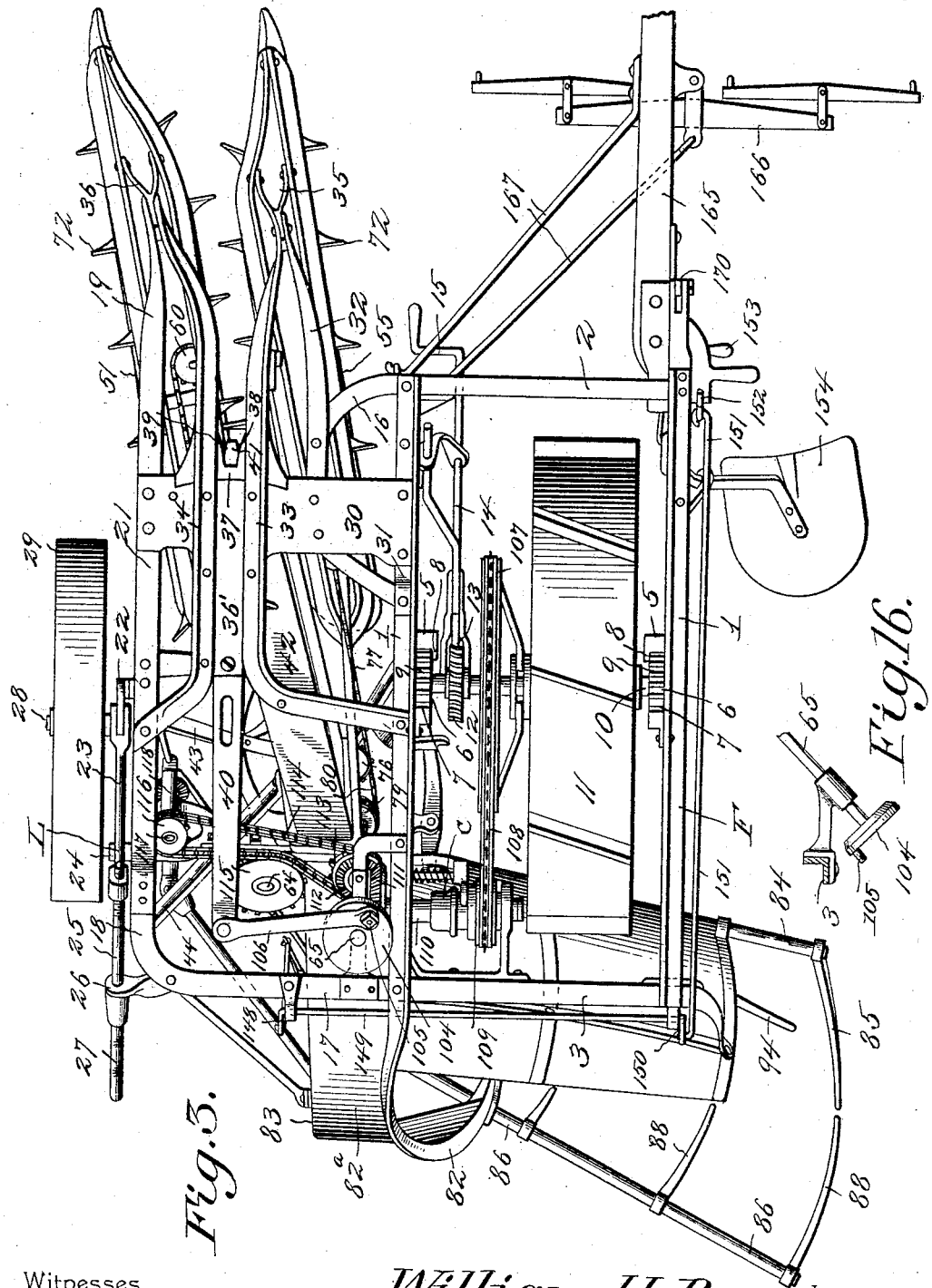

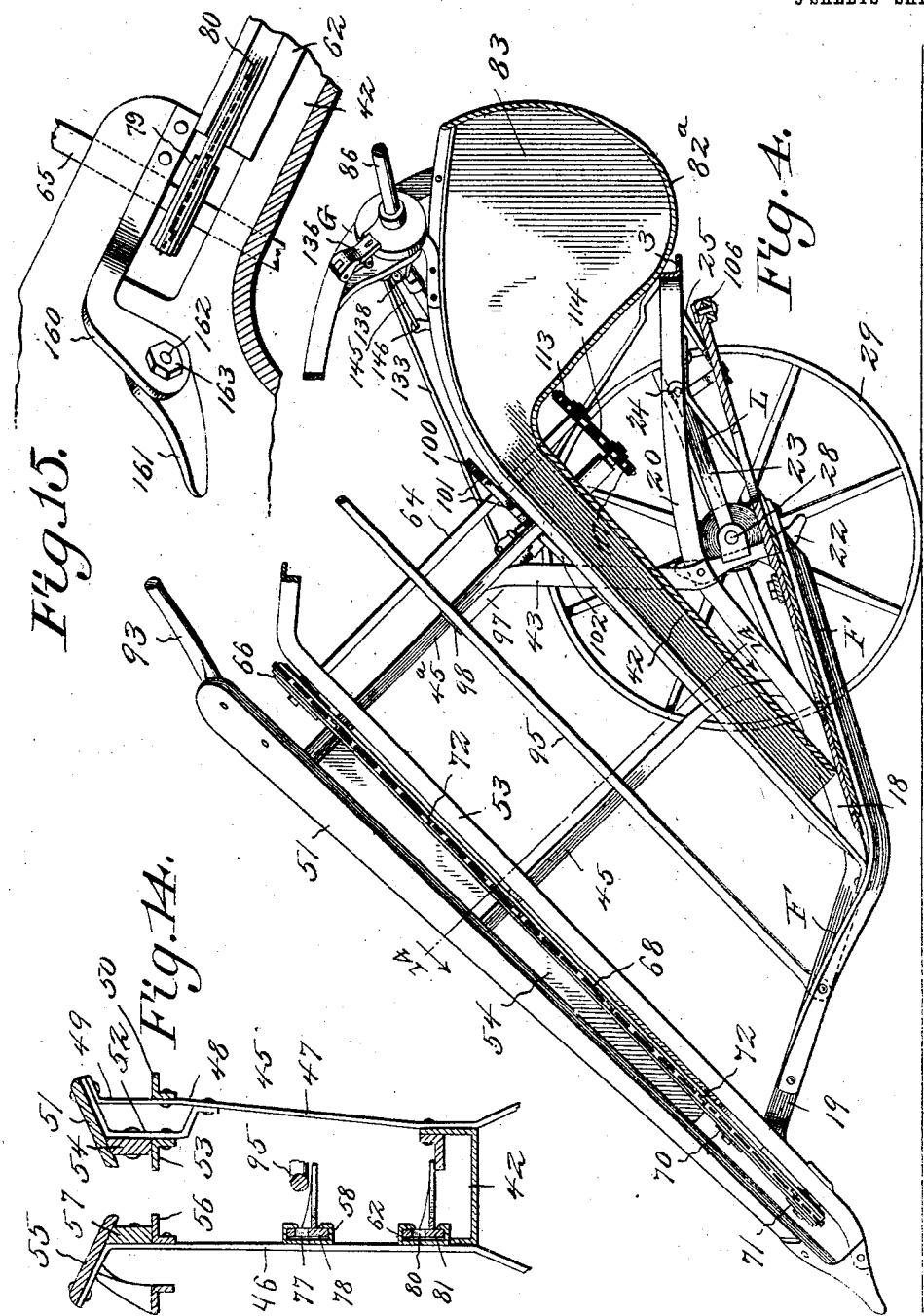

No. 797,075. PATENTED AUG. 15, 1905.
W. H. ROE.
CORN HARVESTER.
APPLICATION FILED JUNE 28, 1904.
5 SHEETS—SHEET 5.
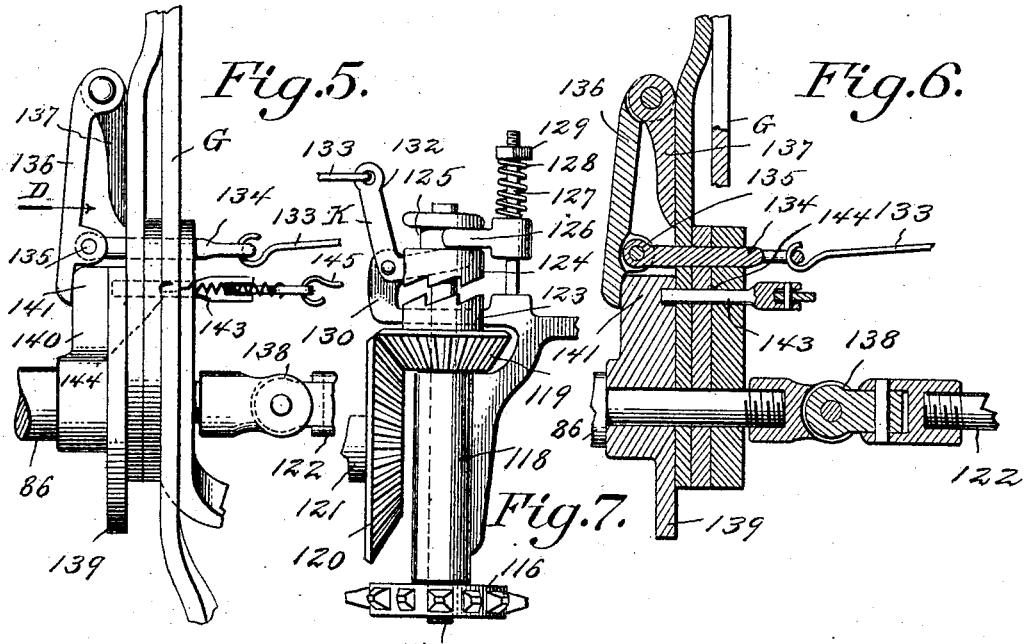
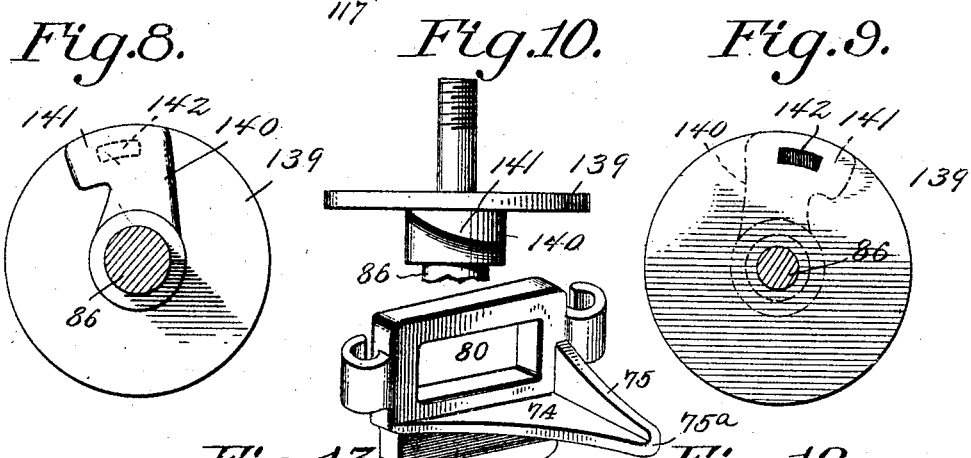
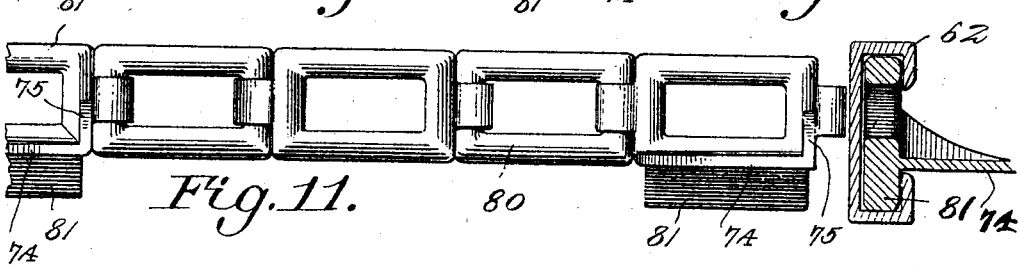
Witnesses
William H. Roe, Inventor.
by C. A. Snow & Co.
Attorneys

UNITED STATES PATENT OFFICE.

WILLIAM H. ROE, OF EASTON, MARYLAND.

CORN-HARVESTER.

No. 797,075.　　　　　Specification of Letters Patent.　　　　　Patented Aug. 15, 1905.

Application filed June 28, 1904. Serial No. 214,533.

*To all whom it may concern:*

Be it known that I, WILLIAM H. ROE, a citizen of the United States, residing at Easton, in the county of Talbot and State of Maryland, have invented a new and useful Corn-Harvester, of which the following is a specification.

This invention relates to that type of corn-harvesters which are provided with means for gathering, guiding, and severing the corn-stalks, for elevating the said stalks, and for depositing them in a cradle or receptacle from whence when a sufficient quantity has accumulated to form a shock the said stalks may be dropped on the ground.

The present invention has for its object to effect certain improvements whereby a machine of this class is provided which shall possess superior advantages in point of simplicity, durability, and general efficiency.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being understood, however, that no limitation is necessarily made to the precise structural details therein exhibited, but that the right is reserved to any changes, alterations, and modifications which come fairly within the scope of the invention and which may be resorted to without departing from the spirit or sacrificing the advantages of the same.

In said drawings, Figure 1 is a side elevation of a corn-harvester constructed in accordance with the principles of the invention, the near wheel being removed. Fig. 2 is a top plan view of the machine complete. Fig. 3 is a bottom plan view of the same. Fig. 4 is a vertical sectional view taken on the plane indicated by the line 4 4 in Fig. 2. Fig. 5 is an elevation of the trip mechanism for the drop-shaft of the cradle. Fig. 6 is a vertical sectional view of the same. Fig. 7 is a detail view of the trip-operating mechanism. Figs. 8 and 9 are detail views of the disk 139 seen from opposite sides. Fig. 10 is an edge view showing the said disk mounted upon the shaft 86. Fig. 11 is a side view of a portion of the outer lead of the carrying-chain 68. Fig. 12 is a transverse sectional view of the guide member 62 and the lead of the chain 77, working in said guide member. Fig. 13 is a perspective detail view of one of the finger-carrying chain-links. Fig. 14 is a sectional detail view taken on the line 14 14 in Fig. 4. Fig. 15 is a detail view showing the portion of the cradle where the stalks are admitted into the latter. Fig. 16 is a detail view showing the bearing for the lower end of the shaft 65.

Corresponding parts in the several figures are indicated by similar characters of reference.

The frame of the machine, which is generally designated F, is constructed throughout of angle-iron of suitable dimensions. The main frame includes two side beams 1 1, connected by front and rear end beams 2 and 3. Above the side beams are supported truss-beams 4 4, which are connected with the main side beams by means of plates 5 5, having segmental slots 6 6, the convex sides of which are provided with teeth 7, while the concave sides of said slots are provided with flanges 8 to accommodate pinions 9, mounted upon the axle 10 of the main transporting-wheel or bull-wheel 11. The pinions 9 engage the teeth or racks 7 on the convex side of the slots. It follows that when the axle bearing the bull-wheel 11 is rotated the pinions 9, engaging the racks 7, will raise or lower the frame according to the direction of rotation. For the purpose of accomplishing this rotation the axle 10 is provided with a worm-gear 12, meshing with a worm 13 upon a suitably-supported shaft 14, having a crank 15, whereby it may be manipulated to raise or lower the frame with relation to the main shaft or axle 10.

The front beam of the main frame is extended laterally to form a reverse curve 16, the extremity of which is connected with the adjacent side beam 1. The rear frame-beam 3 is likewise extended laterally, as shown at 17, and terminates in a forward extension 18. The forward end is bent or curved upwardly, as shown at 19. The beam 18 has an intermediate upwardly-curved portion 20, beneath which is secured a truss-bar 21, spaced from the portion 20 of the bar 18 by a segmental plate 22, which affords a guide for the bifurcated extremity of the long arm 23 of a bell-crank lever L, which is fulcrumed upon the frame at 24 and the short arm of which has a threaded perforation for the passage of a screw-threaded rod 25, which is journaled in a bearing 26 and which has a crank 27, by means of which it may be manipulated to adjust the bell-crank lever. The long arm of the latter is provided with a spindle 28, upon which a supporting-wheel 29 is mounted. The mechanism just described is for the purpose of effecting the convenient adjustment with relation to the frame of the supporting-wheel 29, so that the entire machine may be supported upon the bull-wheel and the supporting-wheel in a level position, which is conducive to the best results during the operation of the device.

30 designates a brace which is secured to the under sides of the frame-bar 18 and the proximate frame-bar 1, a bracket 31 being interposed between the frame-bar and the brace in order that the latter may be supported at the proper level. The brace 30 is also secured by means of bolts extending through the reversely-curved portion 16 of the front frame-bar 2. The brace 30 supports a forwardly-extending curved angle-bar 32, the front end of which is in approximate alinement with the upwardly-curved terminal 19 of the frame-bar 18. Suitably-curved bars or supporting members 33 and 34 are connected at their rear ends with the inner frame-bar 1 and the outer frame part 21, respectively, being thence extended in the direction of each other, thence forwardly parallel to each other, and thence upwardly, terminating in proximity to the terminal ends of the members 32 and 19, respectively. At these points bifurcated brackets 35 and 36 are mounted, the purpose of which will be hereinafter fully set forth.

It is to be understood that the brace 30 and the several parts lying in proximity thereto are to be firmly connected by means of bolts, rivets, or other suitable means, so that this portion of the frame shall be possessed of a great degree of rigidity, which is essential to the successful operation of the device.

The brace 30 has a rearward-extending arm 36', and at the front end of said brace is secured a cutting member 37, having in its front side a recess 38, the sides of which converge rearwardly and are sharpened to form cutting edges 39. Pivotally mounted upon the rearwardly-extending arm 36' is a lever 40, the front end of which carries a cutter 41, which when the lever 40 is vibrated upon its fulcrum coöperates with the cutting edges 39 to sever cornstalks which are guided into contact with the cutter by the frame-bars 33 and 34, which constitute guiding members, as will be readily seen hereinafter.

Suitably secured to and supported upon the lower ends of the frame members 33 and 34 is an upwardly and rearwardly inclined trough 42, which is maintained rigidly in its proper position by means of braces, some of which have been indicated at 43 and 44. This trough is moreover supported by means of uprights 45 45$^a$ and 46 46$^a$, which are suitably mounted to constitute members of the frame of the machine. The outer uprights 45 and 45$^a$ are tilted obliquely in an outward direction, as indicated at 47, to a point 48, from whence they extend vertically in an upward direction, as shown at 49. A guard-rail 50 is secured upon the uprights 45 45$^a$ at the points 48 and the upper extremities of said uprights are bent outwardly to support the outer corn-guide 51. Brackets 52 are attached to the inner sides of the uprights 45 and 45$^a$, which said brackets serve partly to support the guide 51 and partly to support a track-rail 53, bearing a guard 54.

The uprights 46 46$^a$ support at their upper ends the inner corn-guide 55 and below the latter a track-rail 56, bearing a guard 57. The track members 53 and 56 are extended beyond the guards supported thereon to form chain-supporting flanges, which serve to support the inner leads of the carrier-chains, which are to be hereinafter described.

Mounted upon the uprights 46 and 46$^a$, intermediately between the trough 42 and the track member 56, is a longitudinally-slotted tubular member 58, constituting a chain-guide. The forward upright 46 is connected with the converging front ends of the frame members 19 and 34 by means of a bar 59, upon which guide-sprockets 60 and 61 are suitably mounted. The inner side of the trough 42 likewise carries a longitudinally-slotted tubular member 62, constituting a chain-guide, near the front end of which is supported a guide-sprocket 63.

64 and 65 designate a pair of shafts disposed approximately at right angles to the guide-boards 51 and 55, beneath the upper rear ends of the latter. These shafts are provided at their upper ends with driving-sprockets 66 and 67 for the gathering-chains 68 and 69, which operate upon the tracks 53 and 56, disposed beneath the guide-bars. Suitable guide-sprockets 70 and 71 are supported under the front ends of the guide-bars to properly guide the said gathering-chains. The latter are provided with stalk-engaging fingers 72, one of which is by preference attached to every fourth link of each chain. These corn-engaging fingers, which may be constructed of sheet or cast metal or of any other suitable material, are provided with curved corn-engaging edges 73, and they do not extend entirely across the space between the guide-boards, and they will serve to engage the cornstalks, which, by the curved edges 73, are readily guided in a rearward direction between the guide-boards as the machine progresses.

The shaft 65 is provided with an intermediately-disposed driving-sprocket 76, serving to drive the intermediate chain 77, the links of which travel in the slotted tubular guide 58, and the front end of which is guided over the guiding-sprockets 60 and 61. Still another driving-sprocket 79, secured near the lower end of the shaft 65, supports the rear end of the gathering-chain 80, the front end of which is guided over the guide-sprocket 63. This chain is guided through the slotted tubular guide member 62 upon the inner side of the trough 42. The chains 77 and 80 are each provided with links having corn-engaging fingers, every fourth link being preferably provided with one of said fingers. The links which carry the fingers are also provided with downward extensions 81, adapted to engage the lower parts of the tubular guides provided therefor. The corn-engaging fingers consist of members 74, extending forwardly from the links and having curved corn-engaging edges $74^a$ and provided with back walls 75, which extend about half-way up the side of the link, being tapered from thence to the point $75^a$, whereby it is caused to brace and reinforce the member 74 and permitting the upper half of the link to extend upwardly into the tubular guide provided therefor, whereby it is prevented from tilting in an outward direction or from becoming otherwise displaced.

The outer guard-rail 50 is extended obliquely in a rearward direction, and its extension $50^b$ is connected at its rear end with a curved cradle-supporting bracket 82, which constitutes a rearward extension of the inner frame-beam 1. The cradle $82^a$, supported upon this bracket, consists of a sheet-metal casing adapted for the reception of the corn as it is guided rearward in the machine, said casing having an outwardly-inclined end wall 83 to support the butt-ends of the stalks. The front wall of this casing is braced by an upward extension $56^b$ of the track-rail 56. The rear wall of the casing is beaded around a rod 84, which extends laterally beyond the body of the casing and is provided with one or more curved prongs 85.

86 designates a shaft which may be described as constituting the rear side of the cradle and which is supported in suitable bearings, one of which is indicated at 87, at the rear end of the rearward extension $50^b$ of the track-bar 50, which, as hereinbefore described, is joined with the curved cradle-supporting bracket 82. The shaft 86 carries a plurality of curved arms or prongs 88, which coöperate with the body of the casing and with the curved prongs 85 to constitute a receptacle adapted to contain a sufficient quantity of cornstalks to form a shock. Means to be hereinafter described are provided for the purpose of retaining the shaft 86 normally in a position in which it serves to form a casing or container for the stalks of corn that are being gathered. Trip mechanism, which is also to be presently described, is also provided for the purpose of tripping the said shaft when required to drop the corn.

The trough 42, which receives the butt-ends of the cornstalks after the latter have been severed by the cutting apparatus, is inclined upwardly and rearwardly, as clearly shown, to guide the butt-ends of the cornstalks into the cradle or receptacle. The shaft 65 carries a sprocket-wheel 89, from which a finger-carrying chain 90 passes over a sprocket-wheel 91 upon a shaft 92, which is so disposed that the lower ends of the stalks shall be engaged by the fingers of the chain 90 while passing into the cradle or receptacle, as will be readily understood. Guides, consisting of elastic arms 93 94, are suitably connected with the guide-boards 51 and 55, and an additional elastic arm 95 is secured to the upwardly-bent portion 19 of the frame-bar 18 and is extended rearwardly in contact with the inner sides of the uprights 45 and $45^a$, and thence rearwardly, being properly curved, as shown at 96, to guide the corn into the cradle. The arm 95 is pressed in an inward direction by a suitably-disposed spring 97, which is secured in any convenient manner to the frame of the machine and which bears against a lug or enlargement 98 upon the outer side of the arm 95.

The shaft 64 is provided with a suitably-disposed eccentric 99, having a strap 100, which is provided with a pair of prongs 101, which are extended into the path of the corn that passes rearward in the machine. Said eccentric strap is also provided with a stem 102, which extends forwardly and is suitably guided in a staple 103, properly located for the reception of said stem. It is obvious that when the shaft 64 is rotated the strap 100 carrying the prongs 101 will serve to assist in feeding the cornstalks which come in contact therewith in a rearward direction, to be eventually guided into the cradle or receptacle.

The shaft 65 carries at its lower end a disk 104, having a wrist-pin 105, which is connected, by means of a pitman 106, with the rear end of the lever 40, which carries at its front end the knife or cutter 41, which latter is thus actuated by the rotation of the shaft 65. Motion is transmitted to the shaft 65 direct from the driving-wheel 11 of the machine, said wheel being rigidly connected with a large sprocket-wheel 107, which is connected, by means of a chain 108, with a small sprocket-wheel 109 upon a counter-shaft 110. Clutch mechanism, generally designated by letter C and of the usual well-known construction, is employed in connection with the sprocket-wheel 109, which normally is idle upon the shaft 110 to lock said sprocket-wheel upon said shaft when it shall be desired to throw the working parts of the machine into operation. The counter-shaft 110 carries a pinion 111, which meshes with a pinion 112 upon the shaft 65, said pinion 112 being also cast with sprocket-teeth 113, enabling it to be connected, by means of a chain 114, with a sprocket-wheel 115 upon the lower end of the shaft 64 and also with a small sprocket-wheel 116 upon the lower end of a shaft 117, which is provided for the purpose of operating the trip mechanism of the cradle, to which reference has hereinbefore been made and which will be presently described in detail.

The shaft 117, which is supported in suitable bearings, (indicated at 118,) is connected by miter-gearing 119 120 with one end of a shaft 121, the other end of which is connected, by means of a tumbling-rod 122, with the inner end of the rock-shaft 86. The bevel-pinion 119 is loose and free to rotate upon the shaft 117, and it is provided upon its upper surface with a clutch member 123, adapted to be engaged by a movable clutch member 124, mounted slidably upon and rotatable with the shaft 117. The clutch member 124 has an annular groove 125, engaged by a bifurcated member 126, which is vertically slidable upon a stem 127, extending upwardly from the bracket, which constitutes the bearing 118. A spring 128, coiled upon the stem 127 below an adjusting-nut 129, tends to force the clutch member 124 normally in a downward direction and into engagement with the clutch member 123 upon the miter-gear 119. The bracket member 118 has an upwardly-extending arm 130, with which is pivotally connected a bell-crank lever K, one arm of which extends laterally under the bifurcated member 126 and the other upwardly-extending arm of which 132 is connected with one end of a connecting-rod 133, the opposite end of which is connected with a link 134, extending through the framework G of the cradle and having pivotal connection at 135 with a pawl or cam engaging member 136, which is pivotally connected with a bracket 137 upon the framework G.

The framework G has a bearing for one end of the shaft 86, which has been shown in Fig. 6 as having threaded connection with the knuckle-joint 138 at one end of the tumbling-rod 122. The shaft 86 carries a disk 139, (shown in detail in Figs. 8, 9, and 10 of the drawings,) said disk being provided upon its inner side—meaning thereby the side which faces the cradle—with a radial arm 140, terminating at its outer end in a cam 141. The opposite or outer side of the disk has a notch or recess 142, which is in direct alinement or registration with the widest portion of the cam 141 and which is for the reception of a spring-actuated bolt 143, which extends through the framework G, which is perforated, as at 144, for the passage of said bolt. The outer or free end of the bolt 143 is connected, by means of a rod 145, with one arm of a bell-crank lever 146, the other arm of which is connected by a rod 147 with a crank 148 at one end of a rock-shaft 149, supported in suitable bearings at the rear end of the main frame of the machine. The opposite end of the rock-shaft 149 has a crank 150, which is connected, by means of a rod 151, with one arm of the bell-crank lever 152, the other arm of which forms a treadle 153, disposed conveniently with relation to the seat of the driver, which is indicated at 154, thus enabling the driver, by simply pressing his foot upon the treadle 152, to throw or withdraw the spring-actuated bolt from the notch or recess 142 in the disk 139 upon the shaft 86 of the cradle.

The operation of this machine will be readily understood from the foregoing description, taken in connection with the drawings hereto annexed. As the machine progresses over the field the guide-boards or gatherers, the front ends of which are shaped in the usual manner with divergent ends and the supporting-bars of which have suitable connection with the fork members 35 and 36, will engage the corn, the stalks of which will be immediately engaged by the several gathering-chains and conveyed in the direction of the cutting apparatus, whereby the stalks are severed close to the ground and caused to travel or be carried in an upward and rearward direction over the inclined trough 42 and to the cradle, which is provided in close proximity to the sprocket-wheel 79, supporting the rear end of the finger-carrying chain 80, with a bracket 160, to which a guide-arm 161 is adjustably secured, by means of a bolt and nut 162 and 163, for the purpose of tilting the butt-ends of the stalks in the direction of the inclined end wall 83 of the cradle. The eccentric-strap member 100, having the prongs 101 extended into the path of the corn, will obviously assist in pushing or forcing the butt-ends of the stalks in the desired direction. When the cradle is full or when a sufficient quantity of corn has accumulated therein to form a shock of the desired size, the driver, by depressing the treadle 153, throws or withdraws the bolt 143 from the recess 142 in the disk 139 upon the shaft 86. The latter under the impulse of the weight of the corn resting upon the curved arms 88 will naturally begin to rotate, and the cam member 141 will thus immediately pass out of engagement with the pawl or cam-engaging member 136. The tension of the spring 128 will now be exercised to depress the vertically-slidable bifurcated member 126, thus throwing the clutch member 124 into engagement with the clutch member 123 of the bevel-pinion 119, which, as stated, is normally loose or idle, but which now becomes locked upon the shaft 117, which is continuously rotated by the chain engaging the sprocket-wheel 116. The bevel-gear 119 will now transmit motion through the pinion 120, shaft 121, and tumbling-rod 122 to the shaft 86, the rotation of which will thus be positively continued. As soon as a complete revolution of the shaft 86 has been accomplished the cam member 140 will engage the pawl or member 136, which by the action of the spring 128 and connections has been thrown in the direction indicated by the dart D in Fig. 5. The member 136 being thus restored to the normal position indicated in Figs. 5 and 6 of the drawings will actuate the bell-crank lever 132 to elevate the bifurcated member 126 against the tension of the spring 128, thus throwing the clutch member 124 out of engagement with the clutch member 123, and consequently stopping the rotation of the bevel-gear 119. At the same time the spring-actuated bolt 143 will automatically engage the slot or notch 142, and thereby positively secure the disk 139 against further rotation, the driver having obviously in the meanwhile removed his foot from the treadle 153.

I employ in connection with my invention a suitable draft attachment, including a tongue 165, connected pivotally with the frame, and draft appliances 166, which, as well as the tongue itself, are connected with the frame by means of braces 167. Means of ordinary well-known construction and illustrated as including a hand-lever 168, having a spring-actuated pawl or dog engaging a toothed segment 169, and a link 170, connecting said lever with the frame of the machine, are also employed for the purpose of adjusting the front part of the machine vertically in order to enable the machine to operate at various distances above the ground. Adjusting devices of this class are well known in the art and are not intended to be herein specifically claimed.

Instead of accumulating in the cradle of the machine a sufficient quantity of corn to form a shock of the desired size the contents of the cradle may be dumped in certain rows where it is desired to build the shocks, the same being afterward tied and erected in the usual manner.

Having thus described the invention, what is claimed is—

1. In a corn-harvester, a frame structure including stalk-guides, an outer guard-rail for the stalk-guides, said rail having a rearward extension, and a frame side beam having a rearward and upward extension connected with the rearward extension of the guard-rail and coöperating therewith to form a cradle-support.

2. In a corn-harvester, a frame structure including two main side beams, a front beam having a curve the extremity of which is connected with the adjacent side beam, a rear beam extended laterally and forwardly, the forward extension being parallel to the side beams, a brace secured to the under side of said extension and adjacent side beam, a forwardly-extending angle-bar connected with the transverse brace, curved bars or supporting members connected with the brace, extending forwardly and terminating in proximity to the terminal ends of the angle-bar, and of a truss-rod constituting a forward extension of the rear frame-piece, and bifurcated supporting members mounted at said terminal ends.

3. In a corn-harvester, a frame, a brace supported by said frame and having a rearwardly-extending arm, a cutter-carrying lever mounted upon said arm, a cutting element at the front edge of the brace, means for imparting to the cutting-lever a vibratory movement, a guiding-trough supported in the frame above the cutting-lever and extending upwardly and rearwardly, and a cradle or receptacle disposed to receive the discharge from said trough.

4. In a corn-harvester, the combination of cutting mechanism, an upwardly and rearwardly inclined trough, gathering and guiding mechanism including finger-carrying chains supported about parallel to the inclined trough, and a shaft, an eccentric upon said shaft, a strap upon said eccentric, provided with stalk-engaging prongs, and a suitably-guided stem extending from said strap.

5. In a corn-harvester, corn gathering and guiding mechanism including inner and outer uprights, the outer uprights being tilted outwardly, connecting means for said uprights, guide-boards supported at the upper ends of said uprights and suitably spaced apart, endless finger-carrying gathering-chains, supporting means for the same, a guide member extending rearwardly from the supporting-frame, and a spring disposed to press said guide member in the direction of the space between the inner and the outer uprights.

6. In a corn-harvester, corn gathering and guiding mechanism including inner and outer uprights, the outer uprights being tilted outwardly, connecting means for said uprights, guide-boards supported at the upper ends of said uprights and suitably spaced apart, endless finger-carrying gathering-chains, supporting means for the same, and auxiliary elastic guides extending rearwardly from the guide-boards and from the frame supporting the same, an obliquely-disposed rearward continuation of the corn-passage, a finger-carrying chain disposed adjacent thereto, an eccentric disk, the strap supported upon said disk and having stalk-engaging prongs, supporting and operating means for said strap and disk, and a cradle constituting a receptacle for the cut corn.

7. In a corn-harvester, a cradle forming a receptacle for cut corn, a shaft mounted for rotation and having arms constituting part of said cradle, locking means for said shaft, trip mechanism for disengaging said locking means, a continuously-driven shaft, means, including clutch mechanism, for transmitting motion from said shaft to the shaft of the cradle, and means actuated by the partial rotation of the cradle-shaft under the impulse of the weight supported thereon for actuating said clutch mechanism, whereby connection is made with the continuously-driven shaft to complete the rotation of the cradle-shaft.

8. In a machine of the class described, a cradle, a shaft mounted for rotation and having arms constituting a part of said cradle, a disk upon said shaft, having a cam member, a cam-engaging member supported pivotally in proximity to the disk, a continuously-driven shaft, means including clutch mechanism for transmitting motion from the latter to the cradle-shaft, and connecting means between the clutch mechanism and the cam-engaging member, whereby, when the cam passes from engagement with said member, the clutch mechanism will be set, and vice versa.

9. In a machine of the class described, a cradle, a shaft mounted for rotation and having arms constituting part of one side of said cradle, a disk upon said shaft having a cam, a cam-engaging member supported independently of the disk, spring-actuated means for locking said disk in position, a continuously-driven shaft, means including spring-actuated clutch mechanism for transmitting motion from said shaft to the cradle-shaft, connecting means between the clutch mechanism and the cam-engaging member, whereby the disengagement of the latter from the cam will set the clutch mechanism for operation and vice versa, and means for tripping the spring-actuated locking mechanism of the cam-carrying disk, whereby the weight supported upon the curved arms of the cradle-shaft shall cause the partial rotation of the latter when the locking mechanism is tripped, thereby setting the clutch mechanism and causing the rotation of the cradle-shaft until said rotation is checked by the return of the cam into engagement with the cam-engaging member and the automatic resetting of the spring-actuated locking mechanism.

10. In a machine of the class described, a cradle, a shaft mounted for rotation and having curved arms forming part of said cradle, a disk upon said shaft having a recess in one side and a cam upon the other side, a sliding spring-actuated bolt adapted for engagement with the recess, a cam-engaging member pivoted in proximity to the cam-bearing disk, a continuously-driven shaft, means including spring-actuated clutch mechanism for transmitting motion from said shaft to the cradle-shaft, clutch-setting means connected with and operated by the cam-engaging member, a spring-actuated locking-bolt adapted for engagement with the recess in the cam-bearing disk, and means for tripping said rocking mechanism.

11. In a corn-harvester, a cradle constituting a receptacle for cut corn, a bracket connected with said cradle, and an arm connected adjustably with said bracket to guide the butt-ends of the cut corn in the desired direction on entering the cradle.

In testimony that I claim the foregoing as my own I have hereto affixed my signature in the presence of two witnesses.

WM. H. ROE.

Witnesses:
   CHAS. R. WOOTERS,
   HENRY HOLLY DAY, Jr.